J. D. SCOVEL.
ANIMAL SHEARS.
APPLICATION FILED AUG. 23, 1909.
971,931.
Patented Oct. 4, 1910.
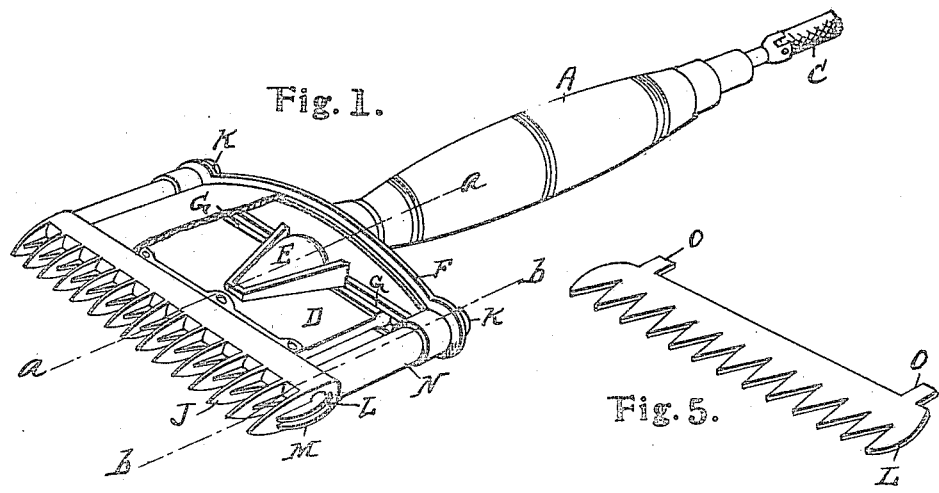
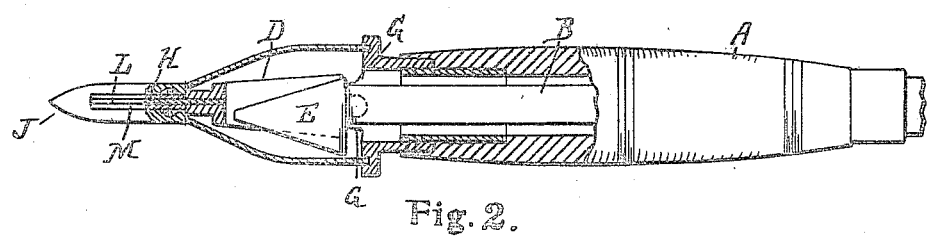
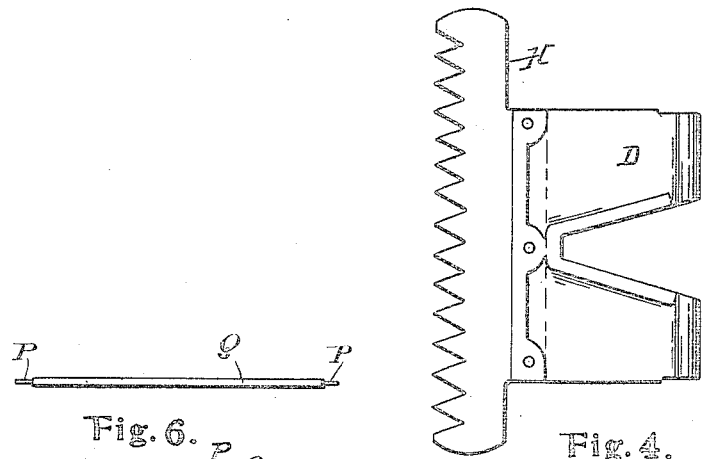
Witnesses
O. B. Baenziger.
C. J. Jennings
Inventor
James D. Scovel
By Parker & Burton
Attorneys

UNITED STATES PATENT OFFICE.

JAMES D. SCOVEL, OF DETROIT, MICHIGAN.

ANIMAL-SHEARS.

971,931.  Specification of Letters Patent.  Patented Oct. 4, 1910.

Application filed August 23, 1909. Serial No. 514,125.

*To all whom it may concern:*

Be it known that I, JAMES D. SCOVEL, a citizen of the United States, residing at Detroit, county of Wayne, State of Michigan, have invented a certain new and useful Improvement in Animal-Shears, and declare the following to be a full, clear, and exact description of the same, such as will enable others skilled in the art to which it pertains to make and use the same, reference being had to the accompanying drawings, which form a part of this specification.

This invention relates to animal shears, and has for its object an improved power actuated shears.

In the drawings:—Figure 1, is a perspective of the shears. Fig. 2, is a sectional elevation along the line $a$—$a$, Fig. 1. Fig. 3, is a section along the line $b$—$b$, Fig. 1. Fig. 4, is a plan view of the reciprocating cutting member and its support. Fig. 5, is a perspective of one of the fixed knives disassociated from its supporting parts. Fig. 6, is an elevation of a pressure bar.

A indicates the hollow handle of the device, through which extends a shaft B that is adapted to be connected in any desired way with the terminal of a flexible shaft C. On its forward end is mounted a taper eccentric E, which engages in a cavity at the center portion of a knife-carrying block D that is mounted to reciprocate in the frame F transversely thereof along the guides G. Removably fixed to the forward edge of this block D is a movable knife H having a serrated cutting edge.

At the forward edge of the frame F is fixed a guard member J, which consists of a comb or set of teeth, one face of which is adapted to be pressed against the skin of the animal on which the shears is used, so as to protect the animal from injury. Through the slotted or cut-away center portion of this comb member, intermediate its top and bottom faces, are removably fixed a pair of stationary shear blades L and M, having their terminal shoulder portions O preferably secured to the side post portion N of the frame. These two members are not placed in contact with one another but are spaced sufficiently to permit the slidable engagement between them of the serrated edge of the reciprocating knife H, which, being actuated by the taper eccentric, as described, causes the serrated knife to move rapidly back and forth and to coöperate with the fixed knife members, whose forward edges are correspondingly serrated, in cutting capillary or other matter which may come between these cutting edges.

The degree to which the fixed knives L and M are projected with respect to the comb member J is regulatable by means of the side screws K, which also serve to hold the members of the frame together.

A tension cushion consisting of a rod P covered with an elastic tube Q prevents vibration, and serves to hold the faces of the cutting parts in contact. The ends of the rods are journaled in arched or recessed parts of the frame piece, each entire rod and its elastic cover being in turn rotatably held in place by the presence on its other side of the adjacent stationary blade, which is thus yieldingly pushed toward, and held in shearing contact with the adjacent face of the reciprocating blade.

What I claim is:—

1. In an animal shears, in combination with a frame work, fixed serrated members supported thereby, a guard comb having teeth of sufficient breadth to space said serrated members from the surface against which the shears are placed, a reciprocating serrated member engaging between said fixed members, and adapted to coöperate therewith in cutting material interposed therebetween, and means for actuating the reciprocating member within a limited path of travel with respect to the other parts, substantially as described.

2. An animal shears, having in combination with a frame member, a reciprocating member having a serrated cutting edge slidably mounted therein, a pair of serrated plates between which the body portion of said reciprocating member engages, means for actuating said reciprocating member and means for regulating the degree of forward projection of said serrated plates with respect to the frame member, substantially as described.

3. In an animal shears, the combination of a frame member having its operating edge in the form of centrally cut-away individual projections, a pair of stationary shear blades having serrations located at corresponding intervals to the projections on the frame mounted therein and spaced from one another, a serrated shear blade engaging therebetween, and adapted to reciprocate with respect thereto, and means for actuating said blade with respect to the frame and said shear blades, substantially as described.

4. In an animal shears, a guard member, a pair of stationary serrated shear blades, means for adjusting said stationary shear blades in said guard member, and a reciprocating serrated shear blade engaging between the stationary shear blades, substantially as described.

In testimony whereof, I sign this specification in the presence of two witnesses.

JAMES D. SCOVEL.

Witnesses:
  CHARLES F. BURTON,
  VIRGINIA C. SPRATT.